C. G. BRODIE.
WATER METER.
APPLICATION FILED MAR. 7, 1914.
1,140,661.
Patented May 25, 1915.
Fig. 1.
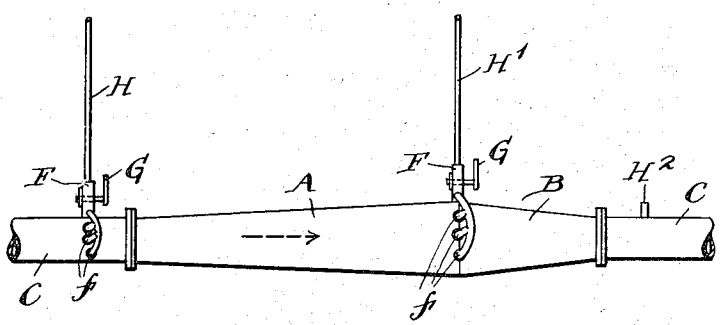
Fig. 2.
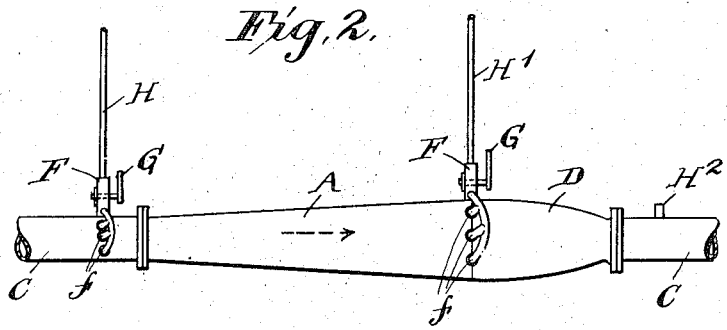
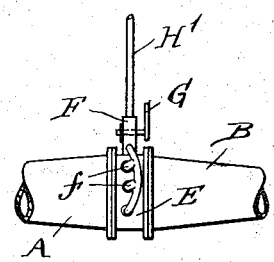
Fig. 3.
Witnesses:
Inventor:
Charles G. Brodie,

UNITED STATES PATENT OFFICE.

CHARLES GORDON BRODIE, OF FERNHILL, WOOTTON BRIDGE, ISLE OF WIGHT, ENGLAND.

WATER-METER.

1,140,661.

Specification of Letters Patent.

Patented May 25, 1915.

Application filed March 7, 1914. Serial No. 823,178.

*To all whom it may concern:*

Be it known that I, CHARLES GORDON BRODIE, a subject of the King of Great Britain, and a resident of Fernhill, Wootton Bridge, Isle of Wight, England, have invented new and useful Improvements in Water-Meters, of which the following is the specification.

This invention relates to an improvement in water meters.

The primary object of the invention is to provide a water meter which will enable the ascertainment of the necessary records without checking the supply through the main.

A further object of the invention is to provide a construction which may be conveniently connected to water mains which are now in use without materially altering their construction and at a small cost.

Broadly the present invention contemplates the provision of a conical enlargement placed in the line of main whereby to cause the velocity of the flow to slacken and consequently the pressure to increase whereby by the indicator tube coming from the entrance to a suitable meter tube will show a lower pressure than that coming from the central enlargement, while a tube taken from the exit in like manner will show a pressure nearly equal to that coming from the entrance showing only a very small loss of head.

The invention further contemplates a structure in which a differential reading or pressure effect between the two tubes which varies with the pressure and therefore with the velocity of the fluid passing through the meter tube, is presented and requires only a small calculation to give the quantity of water which passes through the meter.

In carrying out the invention two cones, the construction of which will be hereinafter described, will be placed together in such a way that their smaller ends are directly secured to the ends of the main itself and are of equal diameter with it, thereby doing away with the necessity for using a throat or contracting piece. Thus the main is allowed to work up to its full capacity which is of course most advantageous in the case of small mains. This construction also permits the differential pressure readings of pressure effects to be taken in two ways either between the pressure in the pressure tube coming from the main just before the commencement of the meter cone, and the tube coming from the central enlargement; or between the pressure of the second tube and a tube taken off the main in a similar manner just after the end of the second cone.

In the accompanying drawings, forming part hereof, Figure 1 is a view in elevation showing the preferred embodiment of my invention, Fig. 2 is a similar view of a modified construction, and Fig. 3 is a fragmentary detail view of still another form of construction.

The meter tube consists of two truncated cones which are secured in any suitable manner together at their larger ends (flange piece omitted in the drawing) while their smaller ends are joined by another flange piece to the main. Thus in the drawing, Fig. 1, A is a divergent cone whose smaller end is bolted by the flange piece to the main C, and whose larger end is joined up with the larger end of the convergent cone B, the smaller end of B being joined by another flange piece to the main C. It is in fact a conical enlargement of the main. From the top and sides of the smaller ends of the cones, a short distance from the point from which they spring, and from the top and sides of the largest part of the central enlargement, where the larger ends of the two cones join, three, five, seven, or more small tubes $f$ are taken, which either meet in a common chamber F, situated on the top or sides of the meter tube or communicate with a common conduit which ends in the chamber F. These small pipes communicate with the interior of the meter tube and main. These small pipes or holes, may be three, five, seven or more in number, so as to provide against any accidental blocking of any of them. The chamber F, can be shut off from the pressure tubes H, by tap G, when necessary.

The enlargement of the divergent cone A, should be very gradual to provide against eddies, and to permit the flow of water to completely fill the tube; its angle of divergence should approximate 5° or 6° though it may vary from 2° to 10° according to circumstances. The length of the side of this cone should be approximately nine times the internal diameter of the main more or less, but a longer or shorter side may be used if circumstances require it. The convergent cone B, may be more abrupt in its contraction and its length of side will be considerably less than that of the divergent cone A. Its length should be approximately three and a half to four and a half times the internal diameter of the main, more or less, but here again the approximate length given shall not prevent the use of a longer or shorter cone if necessary. The angle of this cone should approximate 14° though it may vary to accord with the angle of the divergent cone from 7° to 22°. As the angle of the divergent cone alters, so the cross section ratio may alter from one to one and a half, to one to nine, and it is permissible to alter the ratio, length of sides of both cones, and the angles, according to the quantity and velocity of flow, to get the best results with the meter tube.

In Fig. 2, the sides of the convergent cone D, are shown curved instead of straight. This curve is of a paraboloid nature, but may be represented for all practical purposes (as it is in the drawing) by the arc of a circle whose radius is from 12 to 16 times the internal diameter of the main.

In Fig. 3, a short cylindrical length is shown introduced between the two cones. Its width should not be greater than the internal diameter of the main, its use being to give greater facilities for attachment of the pressure tubes and to steady the flow of water while passing them.

I may use both types of cones shown in Figs. 1 and 2, either with or without the short cylindrical length.

What I claim is:—

1. In an apparatus for measuring fluid passing through a conduit, a pair of conical tubes having their larger ends facing each other, the smaller end of each tube being connected to the conduit whereby fluid passing through the conduit will pass through said tubes, the tubes providing divergent and convergent fluid conductors, the fluid to be measured passing first through the diverging and then through the converging tubes, and means for conducting the fluid to be measured from a point adjacent the juncture of the larger ends of the tubes and from a point in the conduit.

2. In an apparatus for measuring fluid passing through a conduit, a pair of conical tubes having their larger ends facing each other, the smaller end of each tube being connected to the conduit whereby fluid passing through the conduit will pass through said tubes, the tubes providing divergent and convergent fluid conductors, the fluid to be measured passing first through the diverging and then through the converging tubes, and means for conducting the fluid to be measured from a point adjacent the juncture of the larger ends of the tubes and from a point in the conduit, said means in each instance comprising a high pressure tube branching at its connecting end into a plurality of branches, substantially as and for the purpose described.

C. GORDON BRODIE.

Witnesses:
I. D. Roots,
O. J. Worth.